May 2, 1950 F. HARTLEY 2,505,962
INTAKE MANIFOLD
Filed Nov. 29, 1948
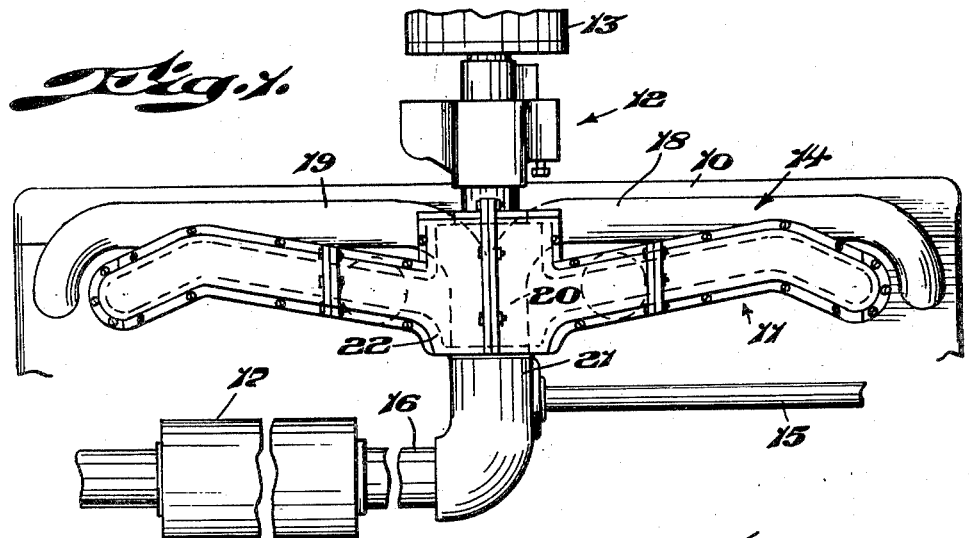
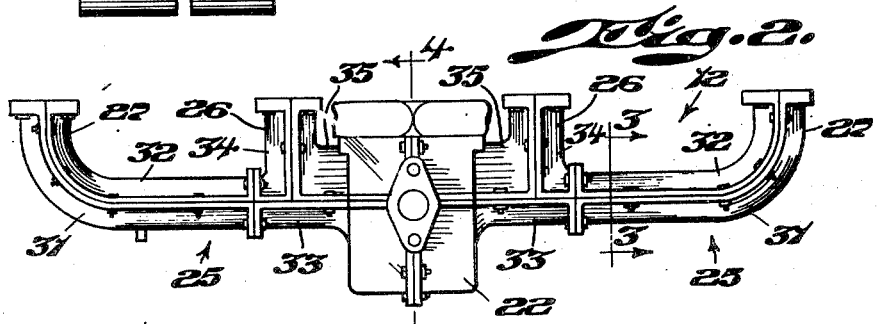
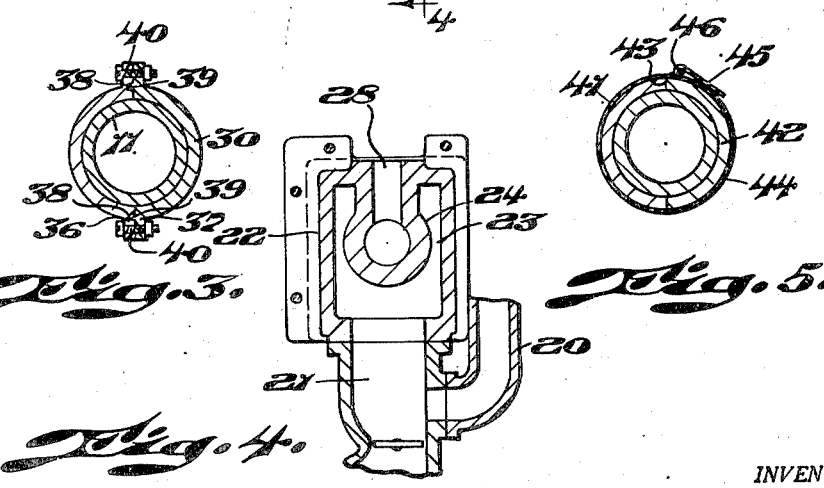
INVENTOR.
Frederick Hartley
BY
Barlow & Barlow
Attorneys Patented May 2, 1950

2,505,962

UNITED STATES PATENT OFFICE 2,505,962

INTAKE MANIFOLD

Frederick Hartley, Farnumsville, Mass.

Application November 29, 1948, Serial No. 62,485

3 Claims. (Cl. 123—52)

This invention relates to an internal combustion gasoline engine and more particularly to the handling of the fuel mixture.

In the operation of an internal combustion gasoline engine, gasoline and air are mixed together in the carburetor and conveyed from the carburetor to each of the cylinders through an intake manifold. Some means are provided adjacent the carburetor for heating the manifold but as the manifold extends from this central point of intake for transfer of the gases to the various cylinders, the manifold may change in temperature or lose heat which has been acquired and thus the gases which are conveyed through the manifold may change in gaseous characteristics or condensation of the gasoline may occur.

One of the objects of this invention is to provide an arrangement so that the fuel gases after mixing and heating will be maintained in substantially their state of mixture and heating without condensation or change.

Another object of this invention is to provide a manifold which will maintain heat which it acquires and transfers along its length for the better conditioning of the fuel mixture as it passes through the manifold.

A more specific object of this invention is to insulate the manifold from the cooler air to which it is subjected so that the heat acquired by this manifold will be maintained by the manifold for a longer period of time and the heat of the manifold will rise to a temperature higher than that usually found in manifolds not provided with this heat insulation.

A more specific object of this invention is to coat the manifold with some heat insulating material throughout its length.

A further specific object of the invention is to provide a covering for the manifold which may be preformed in sections and assembled about the manifold to be held in position by some additional means.

With these and other objects in view, the invention consists of certain novel features of construction, as will be more fully described and particularly pointed out in the appended claims.

In the accompany drawings:

Figure 1 is a side elevation illustrating the intake manifold and parts of an engine with which the manifold is associated, the view being largely diagrammatic;

Figure 2 is a top plan view of the manifold;

Figure 3 is a section on line 3—3 of Figure 2;

Figure 4 is a section substantially centrally of the manifold and illustrating parts of the exhaust manifold as associated therewith; and Figure 5 is a section similar to Figure 3 but showing a modified form of construction.

In proceeding with this invention, I provide an insulating covering over the intake manifold of an internal combustion gasoline engine, this covering being of some non-combustible material such as asbestos, which may be applied by molding or in part sections and then by clamping the sections in place.

With reference to the drawings, I show an internal combustion gas engine block 10 which is provided with an intake manifold designated generally 11 and a carburetor 12 which receives air from the strainer 13 above the carburetor. An exhaust manifold 14 is also provided for the engine block while another air intake is designated 15 and a muffler pipe 16 extends to a muffler 17.

The exhaust manifold designated generally 14 consists of a portion 18 and a portion 19 which come together to provide a common conduit 20 which leads into a chamber 21 from which the exhaust conduit 16 extends to the muffler. A thermostatic valve usually controls this chamber which is connected to the air inlet pipe 15. This chamber 21 communicates with the rectangular chamber 22 of the intake manifold 11, so as to provide a heating chamber 23 about the central portion 24 of this intake manifold which extends in either direction into arms 25 from which branch arms 26 and 27 extend with openings at their ends to conduct gases to each of the different cylinders. The central portion 24 of this manifold is open as at 28 to receive the mixed fuel gases from the carburetor 12.

In order to retain the heat acquired in the portion 24 of this intake manifold, which heat is conveyed by conduction to the arms 25, I have provided a heat insulating cover 30 extending throughout the length of the arms 25 and also over the chamber 22. This heat insulating cover is formed in sections which are preformed such as by molding to fit the shape of the parts of the manifold which they are to cover. Thus, there are the companion sections 31 and 32 to cover the outer extremities of the arms 25 and companion sections 33, 34, and 35 to cover the inner part of the arms 25 and the chamber 22. Each of these sections is provided with flanges 36 and 37 which fit together in abutting relation. The edges are also further formed with tongue and groove connections such as 38 and 39 which fit together and bolts 40 extend through the flanges so as to bind them snugly about the manifold which they cover.

In some cases instead of having outwardly extending flanges with bolts extending through them, the sections 41 and 42 as shown in Figure 5 may abut in edge-to-edge relation as at 43 and a band 44 may extend about the sections with its end 45 passing through a loop 46 and bent back upon itself to hold the band snugly about the sections and the sections in assembled relation about the manifold.

I claim:

1. A manifold for the fuel supply of an internal combustion gas engine comprising a tubular conduit provided with outlet openings at spaced intervals and a covering of fibrous heat insulating material over the outer surface of said conduit, said material being formed in unit sections to fit said conduit with the edges of said sections abutting, said edges being provided with interlocking tongue and groove and means to hold said sections in covering position.

2. A manifold as in claim 1 wherein said sections are provided with flanges extending outwardly and bolts to secure said flanges together.

3. A manifold as in claim 1 wherein there are bands about said sections to secure them together and about said conduit.

FREDERICK HARTLEY.

REFERENCES CITED

The following references are of record in the file of this patent:

UNITED STATES PATENTS

| Number | Name | Date |
|---|---|---|
| 858,046 | Westendarp | June 25, 1907 |
| 934,599 | Flint | Sept. 21, 1909 |
| 2,267,817 | Costs | Dec. 30, 1941 |